(12) United States Patent
Yang et al.

(10) Patent No.: US 11,302,922 B2
(45) Date of Patent: *Apr. 12, 2022

(54) LITHIUM-METAL FREE ANODE FOR ELECTRIC VEHICLE SOLID STATE BATTERIES

(71) Applicant: CHONGQING JINKANG POWERTRAIN NEW ENERGY CO., LTD., Chongqing (CN)

(72) Inventors: Gang Yang, Santa Clara, CA (US); Ying Liu, Santa Clara, CA (US); Yifan Tang, Santa Clara, CA (US)

(73) Assignee: CHONGQING JINKANG POWERTRAIN NEW ENERGY CO., LTD., Chongqing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/234,247

(22) Filed: Dec. 27, 2018

(65) Prior Publication Data

US 2020/0161656 A1 May 21, 2020

Related U.S. Application Data

(63) Continuation of application No. 16/195,237, filed on Nov. 19, 2018.

(51) Int. Cl.
*H01M 4/587* (2010.01)
*B60L 50/64* (2019.01)
(Continued)

(52) U.S. Cl.
CPC ............ *H01M 4/587* (2013.01); *B60L 50/64* (2019.02); *B60K 1/04* (2013.01);
(Continued)

(58) Field of Classification Search
CPC .......................... H01M 4/587; H01M 2220/20
See application file for complete search history.

(56) References Cited

U.S. PATENT DOCUMENTS

2003/0180472 A1\* 9/2003 Zhou ..................... B05D 1/18
427/430.1
2009/0075171 A1 3/2009 Feng et al.
(Continued)

OTHER PUBLICATIONS

Yang et al., "Creating Effective Nanoreactors on Carbon Nanotubes with Mechanochemical Treatments for High-Areal-Capacity Sulfur Cathodes and Lithium Anodes," Advanced Functional Materials, 2018.
(Continued)

*Primary Examiner* — Stewart A Fraser
*Assistant Examiner* — Brent C Thomas
(74) *Attorney, Agent, or Firm* — Cooper Legal Group, LLC

(57) ABSTRACT

Apparatuses, systems, and methods of storing electrical energy for electric vehicles are provided. A battery pack can be disposed in an electric vehicle to power the electric vehicle. A battery cell can be arranged in the battery pack. The battery cell can have a housing. The housing can define a cavity within the housing. The battery cell can have a solid electrolyte arranged within the cavity. The battery cell can have a cathode disposed within the cavity along a first side of the solid electrolyte. The battery cell can have an anode. The anode can have a carbon nanotube structure. The anode can be disposed within the cavity along the second side of the solid electrolyte and separated from the cathode by the solid electrolyte. The carbon nanotube structure can have pores. The pores can be deposited with electrolyte material to retain lithium material received via the solid electrolyte.

17 Claims, 11 Drawing Sheets

(51) Int. Cl.
*B60K 1/04* (2019.01)
*H01M 4/02* (2006.01)
*B60L 50/60* (2019.01)

(52) U.S. Cl.
CPC ....... *B60K 2001/0438* (2013.01); *B60L 50/66* (2019.02); *B60Y 2200/91* (2013.01); *B60Y 2400/112* (2013.01); *H01M 2004/021* (2013.01); *H01M 2004/027* (2013.01); *H01M 2220/20* (2013.01)

(56) References Cited

U.S. PATENT DOCUMENTS

| | | | |
|---|---|---|---|
| 2012/0052414 A1 | 3/2012 | Hama et al. | |
| 2012/0264034 A1* | 10/2012 | Waki | H01M 4/90 |
| | | | 429/482 |
| 2014/0072870 A1* | 3/2014 | Otsuka | H01M 4/13 |
| | | | 429/211 |
| 2017/0271714 A1* | 9/2017 | Iwasaki | B60L 50/64 |
| 2018/0163299 A1* | 6/2018 | Zhou | C23C 16/26 |

OTHER PUBLICATIONS

Non-Final Office Action on U.S. Appl. No. 16/195,237 dated Apr. 5, 2019.
Final Office Action on U.S. Appl. No. 16/195,237 dated Oct. 3, 2019 (17 pages).
Non-Final Office Action on U.S. Appl. No. 16/195,237 dated Jan. 27, 2020 (18 pages).

* cited by examiner

LITHIUM-METAL FREE ANODE FOR ELECTRIC VEHICLE SOLID STATE BATTERIES

CROSS REFERENCE TO RELATED APPLICATIONS

The present application claims the benefit of priority under 35 U.S.C. § 120 as a continuation of U.S. patent application Ser. No. 16/195,237, filed Nov. 19, 2018 and titled "LITHIUM-METAL FREE ANODE FOR ELECTRIC VEHICLE SOLID STATE BATTERIES," which is incorporated herein by reference in its entirety.

BACKGROUND

Batteries can include electrochemical cells to supply electrical power to various electrical components connected thereto. Such batteries can be installed in a vehicle (e.g., an automobile) to provide electrical energy to various electrical systems within the vehicle.

SUMMARY

The present disclosure is directed to batteries cells for battery packs in electrical vehicles. A battery cell can be a solid-state battery, and can have a solid electrolyte and an anode and a cathode on opposing faces of the solid electrolyte. The anode of battery cell can include a carbon nanotube structure. The carbon nanotube can have pores deposited with electrolyte material to retain lithium material received via the solid electrolyte therein. Such a formation can improve the operation of the battery cell by preventing dendritic growth of lithium as well as enhancing electrical conductivity of the anode.

At least one aspect is directed to an apparatus to store electrical energy for electric vehicles. The apparatus can include a battery pack. The battery pack can be disposed in an electric vehicle to power the electric vehicle. The apparatus can include a battery cell. The battery cell can be arranged in the battery pack. The battery cell can have a housing. The housing can define a cavity within the housing of the battery cell. The battery cell can have a solid electrolyte. The solid electrolyte can have a first side and a second side. The solid electrolyte can transfer ions between the first side and the second side. The solid electrolyte can be arranged within the cavity. The battery cell can have a cathode. The cathode can be disposed within the cavity along the first side of the solid electrolyte. The cathode can be electrically coupled with a positive terminal. The battery cell can have an anode. The anode can have a carbon nanotube structure. The anode can be disposed within the cavity along the second side of the solid electrolyte and separated from the cathode by the solid electrolyte. The carbon nanotube structure can have a plurality of pores. The plurality of pores can be deposited with electrolyte material to retain lithium material received via the solid electrolyte.

At least one aspect is directed to a system to store electrical energy for electric vehicles. The system can include a battery pack. The battery pack can be disposed in an electric vehicle to power the electric vehicle. The system can include a battery cell. The battery cell can be arranged in the battery pack. The battery cell can have a housing. The housing can define a cavity within the housing of the battery cell. The battery cell can have a solid electrolyte. The solid electrolyte can have a first side and a second side. The solid electrolyte can transfer ions between the first side and the second side. The solid electrolyte can be arranged within the cavity. The battery cell can have a cathode. The cathode can be disposed within the cavity along the first side of the solid electrolyte. The cathode can be electrically coupled with a positive terminal. The battery cell can have an anode. The anode can have a carbon nanotube structure. The anode can be disposed within the cavity along the second side of the solid electrolyte and separated from the cathode by the solid electrolyte. The carbon nanotube structure can have a plurality of pores. The plurality of pores can be deposited with electrolyte material to retain lithium material received via the solid electrolyte.

At least one aspect is directed to a method of providing battery cells to power electric vehicles. The method can include disposing a battery pack in an electric vehicle to power the electric vehicle. The method can include arranging a housing for a battery cell in the battery pack. The housing can define a cavity within the housing for the battery cell. The method can include arranging, within the cavity of the battery cell, a solid electrolyte. The solid electrolyte can have a first side and a second side to transfer ions between the first side the second side. The method can include disposing, within the cavity of the battery cell, a cathode along the first side of the solid electrolyte. The cathode can be electrically coupled with a positive terminal. The method can include disposing, within the cavity, an anode. The anode can have a carbon nanotube structure along the second side of the solid electrolyte. The anode can be separated from the cathode by the solid electrolyte. The anode can be electrically coupled with the negative terminal. The carbon nanotube structure can have a plurality of pores. The plurality of pores can be deposited with electrolyte material to retain lithium material received via the solid electrolyte.

At least one aspect is directed to an electric vehicle. The electric vehicle can include one or more components. The electric vehicle can include a battery pack to power the one or more components. The electric vehicle can include a battery cell. The battery cell can be arranged in the battery pack. The battery cell can have a housing. The housing can define a cavity within the housing of the battery cell. The battery cell can have a solid electrolyte. The solid electrolyte can have a first side and a second side. The solid electrolyte can transfer ions between the first side and the second side. The solid electrolyte can be arranged within the cavity. The battery cell can have a cathode. The cathode can be disposed within the cavity along the first side of the solid electrolyte. The cathode can be electrically coupled with a positive terminal. The battery cell can have an anode. The anode can have a carbon nanotube structure. The anode can be disposed within the cavity along the second side of the solid electrolyte and separated from the cathode by the solid electrolyte. The carbon nanotube structure can have a plurality of pores. The plurality of pores can be deposited with electrolyte material to retain lithium material received via the solid electrolyte.

At least one aspect is directed to a method. The method can include providing an apparatus. The apparatus can be included in an electric vehicle. The apparatus can include a battery pack. The battery pack can power the electric vehicle. The apparatus can include a battery cell. The battery cell can be arranged in the battery pack. The battery cell can have a housing. The housing can define a cavity within the housing of the battery cell. The battery cell can have a solid electrolyte. The solid electrolyte can have a first side and a second side. The solid electrolyte can transfer ions between the first side and the second side. The solid electrolyte can be arranged within the cavity. The battery cell can have a cathode. The cathode can be disposed within the cavity along the first side of the solid electrolyte. The cathode can be electrically coupled with a positive terminal. The battery cell can have an anode. The anode can have a carbon nanotube structure. The anode can be disposed within the cavity along the second side of the solid electrolyte and separated from the cathode by the solid electrolyte. The carbon nanotube structure can have a plurality of pores. The plurality of pores can be deposited with electrolyte material to retain lithium material received via the solid electrolyte.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Figure 1:
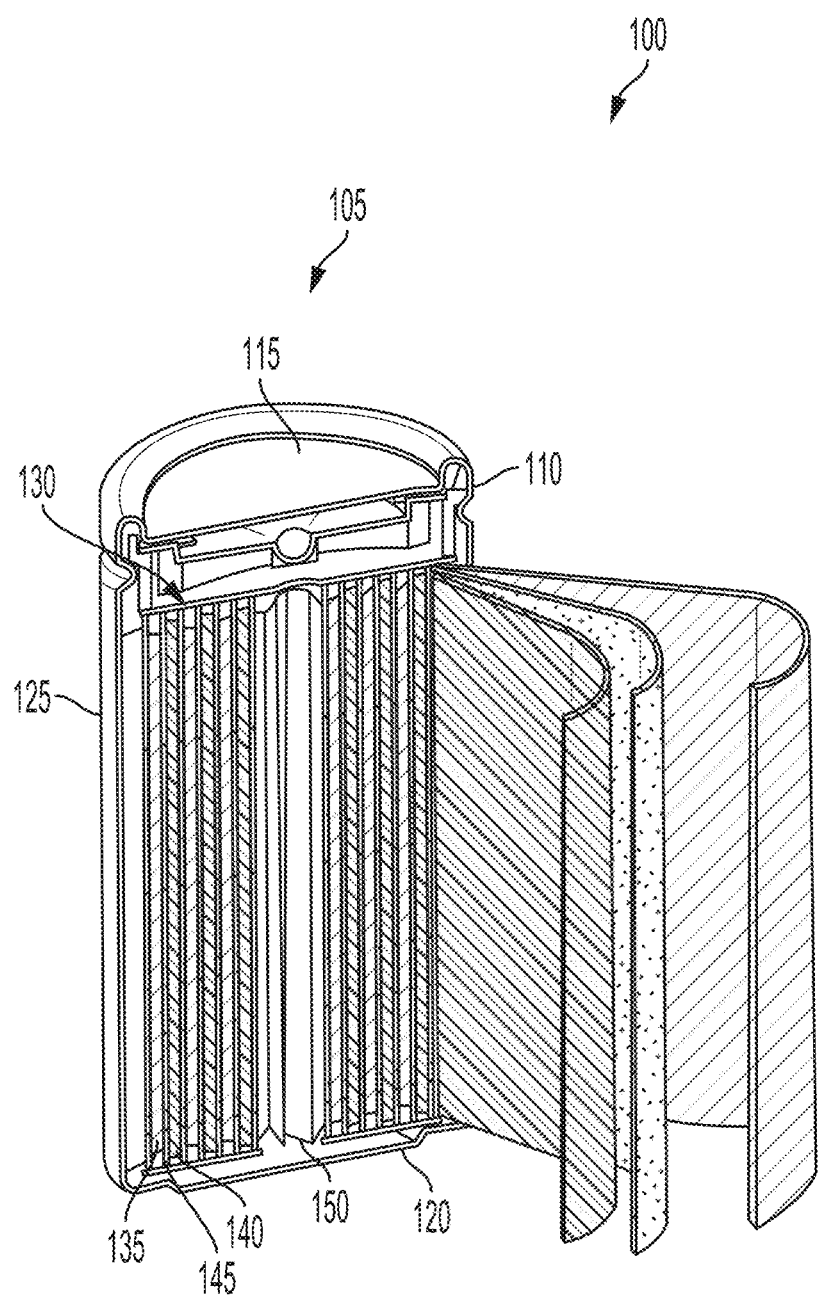
FIG. 1 is an isometric cross-sectional perspective of an example battery cell for powering electric vehicles.

Following below are more detailed descriptions of various concepts related to, and implementations of battery cells for battery packs in electric vehicles. The various concepts introduced above and discussed in greater detail below can be implemented in any of numerous ways.

Described herein are battery cells for battery packs in electric vehicles for an automotive configuration. An automotive configuration includes a configuration, arrangement or network of electrical, electronic, mechanical or electro-mechanical devices within a vehicle of any type. An automotive configuration can include battery cells for battery packs in electric vehicles (EVs). EVs can include electric automobiles, cars, motorcycles, scooters, passenger vehicles, passenger or commercial trucks, and other vehicles such as sea or air transport vehicles, planes, helicopters, submarines, boats, or drones. EVs can be fully autonomous, partially autonomous, or unmanned.

One type of battery cell that can be used in the electric vehicle can include lithium-ion based batteries. A membrane holding a liquid electrolyte (e.g., Lithium tetrafluoroborate ($LiBF_4$), Lithium hexafluorophosphate ($LiPF_6$), and Lithium perchlorate ($LiClO_4$)) dissolved in an organic solvent (e.g., dimethyl carbonate (DMC), ethylene carbonate (EC), or diethyl carbonate (DEC)) can be used in lithium-ion based batteries to transfer ions between the anode and the cathode. The liquid electrolyte, however, can be volatile and flammable, and can combust when the battery cell becomes overheated or experiences high levels of internal pressure. The combustion of the battery cell can be especially problematic in automotive settings, with the outbreak of fire potentially spreading over to other components of the electric vehicle. To reduce the risk of combustion from within the battery cell, a solid electrolyte (e.g., a solid polymer electrolyte, a ceramic electrolyte, or a glass electrolyte) can be used. Solid electrolytes can be less volatile and flammable than liquid electrolytes. Moreover, an additional benefit of using of solid electrolyte in lithium-ion batteries can include a boosting of energy density relative to battery cells with liquid electrolytes.

Replacing the liquid electrolyte with the solid electrolyte, however, can raise a myriad of other technical challenges, especially in the interfacing of the anode with the solid electrolyte. The material used for the anode in lithium-ion battery cells can include graphite or lithium metal, among others. Using lithium in the anode of the battery cell can improve energy density. One drawback of using lithium, however, can be the dendritic growth into the solid electrolyte during charging of the battery cell. The dendritic growth of lithium material can eventually pierce the solid electrolyte contacting the cathode, resulting in short circuiting and catastrophic failure of the battery cell. Using graphite as the anode of the battery cell can lead to poor electrical conductivity between the solid electrolyte and the terminal of the battery cell. Not to mention, the use of graphite at the anode can also lead the dendritic growth of lithium material received via the solid electrolyte back into the solid electrolyte, raising the risk of short circuiting of the battery cell. Moreover, both lithium and graphite may have poor contact and interfacing with the solid electrolyte due to the powdery nature of the solid electrolyte. This can result in poor electrical conductivity through the anode, and high interfacial resistance between the anode and the cathode, thereby lessening the utility of the battery cell. For proper operation of lithium-ion battery cells with solid electrolytes, high pressure can be imposed to increase conductivity and improve contact between the anode and the solid electrolyte. But the imposition of the high pressure within the battery cell can be difficult to maintain and also can increase the structural complexity of the battery cell.

To address the technical challenges in solid-state lithium-ion batteries, a self-standing carbon nanotube structure with pores can be used as the anode of the battery cell. The carbon nanotube structure can be deposited with solid electrolyte material to serve as a conductive pathway for electron transfer through the solid electrolyte and the anode. The carbon nanotube structure can be initially free of lithium metal. The carbon nanotube structure can be treated to make the surface of each tube lithio-philic by defining pores into the carbon nanotube tube. The pores of the carbon nanotube structure can provide space to host and retain lithium material received through the solid electrolyte within the anode as the battery cell charges and discharges, thereby reducing dendritic growth of lithium. To fabricate the lithium metal free anode for the lithium-ion battery cell, the self-standing carbon nanotube structure can be synthesized by chemical vapor deposition (CVD). The surface of each carbon nanotube can be treated to render the surface lithio-philic using an acidic solution to cut pores into the surface. Once treated, the carbon nanotube structure can be infused with solid electrolyte material by immersing the carbon nanotube structure into a solution containing the solid electrolyte material. The carbon nanotube structure can then be housed as the anode of the battery cell, adjacent to and in contact with the solid electrolyte. As there can be solid electrolyte material in both the carbon nanotube structure and the solid electrolyte layer, the interfacing between the anode and the solid electrolyte can be improved.

In this manner, lithium metal can be eliminated from the anode during the battery cell assembly process, thereby decreasing the processing complexity. With the use of the carbon nanotube structure as the anode, lithium dendrite formation can be prevented or reduced as a result of the lithio-philic nature of the surface of each carbon nanotube. The reduction of lithium dendrite formation can lower the risk of short circuiting between the anode and the cathode, and can improve the lifespan of the battery cell. Additionally, with improved contact between the anode and the solid electrolyte, interface resistance can be reduced and electrical conductivity can be increased, thereby promoting electron transfer through the solid electrolyte.

FIG. 1, among others, depicts an isometric, cross-sectional view of a battery cell 105 for powering electric vehicles. The battery cell 105 can be part of a system or an apparatus 100 for powering components of electric vehicles. The battery cell 105 can be a solid-state lithium-ion battery cell to power electrical components (e.g., components of an electric vehicle). The battery cell 105 can include a housing 110. The housing 110 can be contained in a battery module, a battery pack, or a battery array installed in an electric vehicle. The housing 110 can be of any shape. The shape of the housing 110 can be cylindrical with a circular (e.g., as depicted), elliptical, or ovular base, among others. The shape of the housing 110 can also be prismatic with a polygonal base, such as a triangle, a square, a rectangle, a pentagon, and a hexagon, among others. The housing 110 can have a length (or height) ranging between 65 mm to 125 mm. The housing 110 can have a width (or diameter in cylindrical examples as depicted) ranging between 18 mm to 45 mm. The housing 110 can have a thickness ranging between 100 mm to 200 mm.

The housing 110 of the battery cell 105 can include one or more materials with various electrical conductivity or thermal conductivity, or a combination thereof. The electrically conductive and thermally conductive material for the housing 110 of the battery cell 105 can include a metallic material, such as aluminum, an aluminum alloy with copper, silicon, tin, magnesium, manganese or zinc (e.g., of the aluminum 1000, 4000, or 5000 series), iron, an iron-carbon alloy (e.g., steel), silver, nickel, copper, and a copper alloy, among others. The electrically insulative and thermally conductive material for the housing 110 of the battery cell 105 can include a ceramic material (e.g., silicon nitride, silicon carbide, titanium carbide, zirconium dioxide, beryllium oxide, and among others) and a thermoplastic material (e.g., polyethylene, polypropylene, polystyrene, polyvinyl chloride, or nylon), among others.

The housing 110 of the battery cell 105 can have at least one lateral surface, such as a top surface 115 and a bottom surface 120. The top surface 115 can correspond to a top lateral side of the housing 110. The top surface 115 can be an integral portion of the housing 110. The top surface 115 can be separate from the housing 110, and added onto the top lateral side of the housing 110. The bottom surface 120 can correspond to a bottom lateral side of the housing 110, and can be on the opposite side of the top surface 115. The bottom surface 120 can correspond to a top lateral side of the housing 110. The bottom surface 120 can be an integral portion of the housing 110. The top surface 115 can be separate from the housing 110, and added onto the top lateral side of the housing 110. The housing 110 of the battery cell 105 can have at least one longitudinal surface, such as a sidewall 125. The sidewall 125 can extend between the top surface 115 and the bottom surface 120 of the housing 110. The sidewall 125 can have an indented portion (sometimes referred herein to as a neck or a crimped region) thereon. The top surface 115, the bottom surface 120, and the sidewall 125 can define a cavity 130 within the housing 110. The cavity 130 can correspond to an empty space, region, or volume within the housing 110 to hold content of the battery cell 105. The cavity 130 can span among the top surface 115, the bottom surface 120, and the sidewall 125 within the housing 110.

The battery cell 105 can include a cathode layer 135 (sometimes herein generally referred to as a cathode). The cathode layer 135 can be situated, arranged, or otherwise disposed within the cavity 130 defined by the housing 110. At least a portion of the cathode layer 135 can be in contact or flush within an inner side of the side wall 125. At least a portion of the cathode layer 135 can be in contact or flush with an inner side of the bottom surface 120. The cathode layer 135 can output conventional electrical current out from the battery cell 105 and can receive electrons during the operation of the battery cell 105. The cathode layer 135 can also release lithium ions during the operation of the battery cell 105. As the battery cell 105 can be a solid-state lithium-ion battery, the cathode layer 135 can be comprised of a solid cathode material, such as a lithium-based oxide materials or phosphates. The cathode layer 135 can be comprised of Lithium Cobalt Oxide ($LiCoO_2$), Lithium Iron Phosphate ($LiFePO_4$), Lithium Manganese Oxide ($LiMn2O4$), Lithium Nickel Manganese Cobalt Oxide ($LiNi_xMn_yCo_zO_2$), Lithium Nickel Cobalt Aluminum Oxide ($LiNiCoAlO_2$), among other lithium-based materials. The cathode layer 135 can have a length (or height) ranging between 50 mm to 120 mm. The cathode layer 135 can have a width ranging between 50 mm to 2000 mm. The cathode layer 135 can have a thickness ranging between 50 μm to 200 μm.

The battery cell 105 can include at least one anode layer 140 (sometimes herein generally referred to as an anode). The anode layer 140 can be situated, arranged, or otherwise disposed within the cavity 130 defined by the housing 110. At least a portion of the anode layer 140 can be in contact or flush within an inner side of the side wall 125. At least a portion of the anode layer 140 can be in contact or flush with an inner side of the bottom surface 120. The anode layer 140 can receive conventional electrical current into the battery cell 105 and output electrons during the operation of the battery cell 105 (e.g., charging or discharging of the battery cell 105). With the battery cell 105 being a solid-state lithium-ion battery, the anode layer 140 can be comprised of a solid anode material. The anode layer 140 can be comprised of a carbon material with allotropic structure. The anode layer 140 can be initially free of lithium material prior to the first charging cycle of the battery cell 105. The anode layer 140 can have a length (or height) ranging between 50 mm to 120 mm. The anode layer 140 can have a width ranging between 50 mm to 2000 mm. The anode layer 140 can have a thickness ranging between 15 µm to 200 µm.

The battery cell 105 can include a solid electrolyte layer 145 (sometimes herein generally referred to as a solid electrolyte). The solid electrolyte layer 145 can be situated, disposed, or otherwise arranged within the cavity 130 defined by the housing 110. At least a portion of the solid electrolyte layer 145 can be in contact or flush within an inner side of the side wall 125. At least a portion of the solid electrolyte layer 145 can be in contact or flush with an inner side of the bottom surface 120. The solid electrolyte layer 145 can be arranged between the anode layer 140 and the cathode layer 135 to separate the anode layer 140 and the cathode layer 135. The solid electrolyte layer 145 can transfer ions between the anode layer 140 and the cathode layer 135. The solid electrolyte layer 145 can transfer cations from the anode layer 140 to the cathode layer 135 during the operation of the battery cell 105. The solid electrolyte layer 145 can transfer anions (e.g., lithium ions) from the cathode layer 135 to the anode layer 140 during the operation of the battery cell 105.

With the battery cell 105 being a solid-state lithium-ion battery, the solid electrolyte layer 145 can include a solid electrolyte material. The solid electrolyte layer 145 can be comprised of a ceramic electrolyte material, such as Lithium Phosphorous Oxy-Nitride ($Li_xPO_yN_z$), Lithium Germanium Phosphate Sulfur ($Li_{10}GeP_2S_{12}$), Yttria-stabilized Zirconia (YSZ), NASICON ($Na_3Zr_2Si_2PO_{12}$), beta-alumina solid electrolyte (BASE), perovskite ceramics (e.g., Strontium titanate ($SrTiO_3$)), among others. The solid electrolyte layer 145 can be comprised of a polymer electrolyte material, such as polyacrylonitrile (PAN), polyethylene oxide (PEO), polymethyl-methacrylate (PMMA), and polyvinylidene fluoride (PVDF), among others. The solid electrolyte layer 145 can be comprised of a glassy electrolyte material, such as Lithium Sulfide-Phosphor Pentasulfide ($Li_2S$—$P_2S_5$), Lithium Sulfide-Boron Sulfide ($Li_2S$—$B_2S_3$), and Tin Sulfide-Phosphor Pentasulfide ($SnS$—$P_2S_5$). The solid electrolyte material 145 can include any combination of the ceramic electrolyte material, the polymer electrolyte material, and the glassy electrolyte material, among others. The solid electrolyte layer 145 can have a length (or height) ranging between 50 mm to 120 mm. The solid electrolyte layer 145 can have a width ranging between 50 mm to 2000 mm. The solid electrolyte layer 145 can have a thickness ranging between 10 µm to 100 µm.

The battery cell 105 can include at least one center support 150. The center support 150 can be situated, arranged, or disposed within the cavity 130 defined by the housing 130. At least a portion of the center support 150 can be in contact or flush within an inner side of the side wall 125. At least a portion of the center support 150 can be in contact or flush with an inner side of the bottom surface 120. The center support 150 can be positioned in a hollowing defined by the anode layer 140, the cathode layer 135, or the solid electrolyte layer 145. The center support 150 in the hollowing can be any structure or member to wrap around the anode layers 135, the cathode layers 140, and the solid electrolyte layers 145 in stack formation. The center support 150 can include an electrically insulative material, and the center support 150 can function neither as the positive terminal nor the negative terminal for the battery cell 105. The battery cell 105 can also lack or not include the center support 150.

Figure 2:
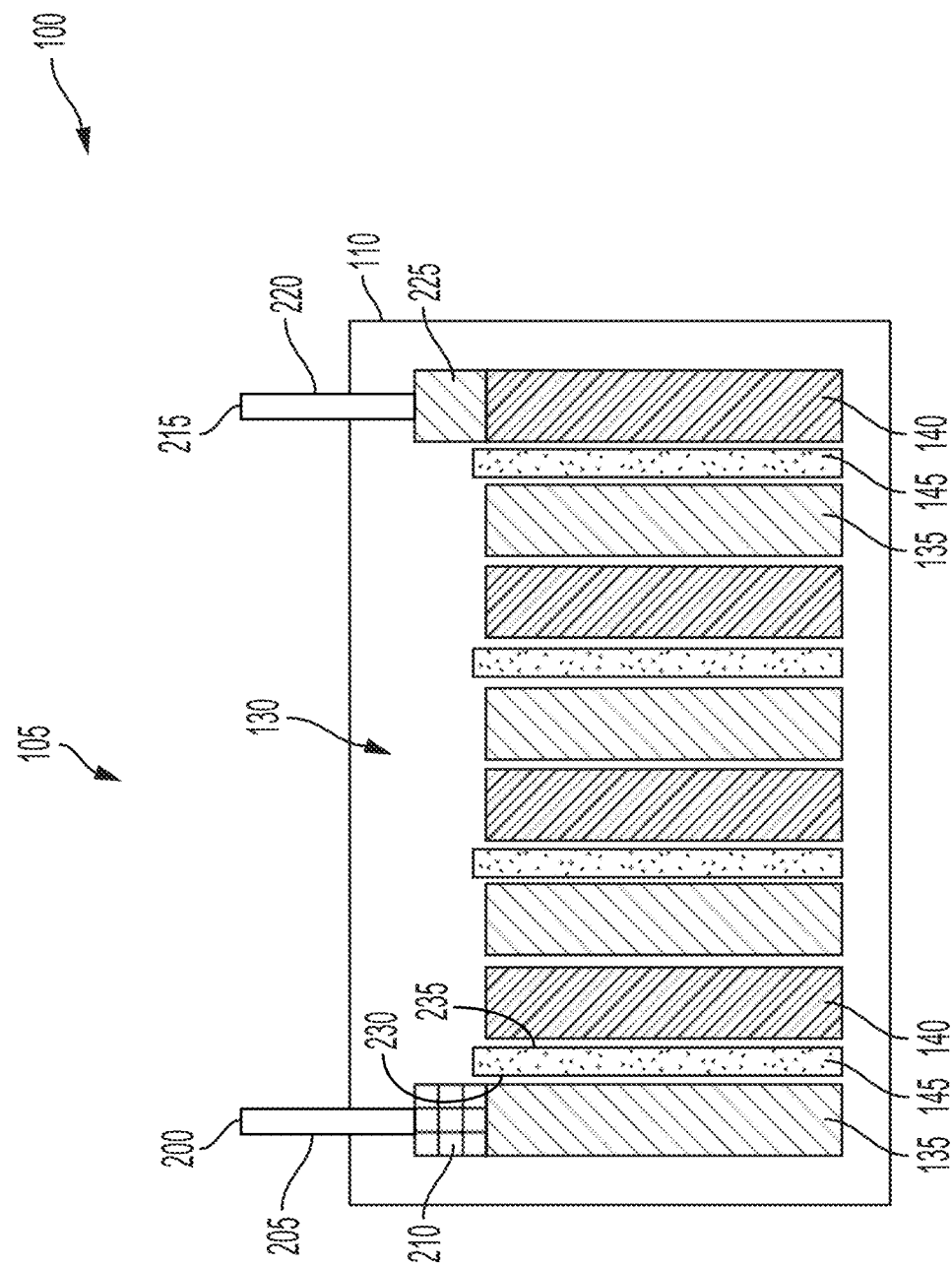
FIG. 2 is a cross-sectional block diagram of an example battery cell for powering electric vehicles.

FIG. 2, among others, depicts a cross-sectional view of the battery cell 105 for powering electric vehicles. As depicted, the battery cell 105 can include at least one positive terminal 200. The positive terminal 200 can correspond to an end at which conventional electrical current can be outputted from the battery cell 105 and electrons can be received during the operation of the battery cell 105 (e.g., charging or discharging of the battery cell 105). The positive terminal 200 can be defined anywhere on the housing 110, such as the top surface 115, the bottom surface 120, and the sidewall 125. For example, the positive terminal 200 can be defined along the top surface 115 of the housing 110. The positive terminal 200 can correspond to at least a portion of the top surface 115 of the housing 110. The positive terminal 200 can be electrically coupled with at least a portion of the top surface 115 of the housing 110. The positive terminal 200 can be electrically coupled with the cathode layer 135 disposed in the cavity 130 of the housing 110.

The battery cell 105 can include at least one positive bonding element 205. The positive bonding element 205 can correspond to an electrically conductive wire. The electrically conductive material for the positive bonding element 205 can include a metallic material, such as aluminum, an aluminum alloy with copper, silicon, tin, magnesium, manganese or zinc (e.g., of the aluminum 1000, 4000, or 5000 series), iron, an iron-carbon alloy (e.g., steel), silver, nickel, copper, and a copper alloy, among others. The positive bonding element 205 can extend partially within the cavity 130 defined by the housing 110. The positive bonding element 205 can correspond to the positive terminal 200 of the battery cell 105. The positive bonding element 205 can be electrically couple with the cathode layer 135 disposed in the cavity 130 of the housing 110 with the positive terminal 200 to carry conventional electrical current to the cathode layer 135.

The battery cell 105 can include at least one positive contact 210. The positive contact 210 can be disposed or arranged on one end of the cathode layer 135 disposed within the cavity 130 of the housing 110. The positive contact 210 can be at least partially in physical contact with a portion (e.g., a top end as depicted or along a longitudinal side) of the cathode layer 135. The positive contact 210 can electrical couple the positive bonding element 205 to the cathode layer 135 disposed within the cavity 130 of the housing 110. The positive contact 210 can be attached, welded, bonded, or otherwise joined to the positive bonding element 205. The positive contact 210 can carry conventional electrical current into the cathode layer 135 during operation of the battery cell 105. The electrically conductive material of the positive contact 210 can include a metallic material, such as aluminum, an aluminum alloy with copper, silicon, tin, magnesium, manganese or zinc (e.g., of the aluminum 1000, 4000, or 5000 series), iron, an iron-carbon alloy (e.g., steel), silver, nickel, copper, and a copper alloy, among others.

The battery cell 105 can include at least one negative terminal 215. The negative terminal 215 can correspond to an end at which conventional electrical current can be received into the battery cell 105 and electrons can be released during the operation of the battery cell 105. The negative terminal 215 can be defined anywhere on the housing 110, such as the top surface 115, the bottom surface 120, and the sidewalls 125. For example, the negative terminal 215 can be defined along the sidewall 125 of the housing 110. The negative terminal 215 can correspond to at least a portion of the sidewall 125 of the housing 110. The negative terminal 215 can be electrically coupled with at least a portion of the sidewall 125 of the housing 110. The negative terminal 215 can be electrically coupled with the anode layer 140 disposed in the cavity 130 of the housing 110.

The battery cell 105 can include at least one negative bonding element 220. The negative bonding element 220 can correspond to an electrically conductive wire. The electrically conductive material for the negative bonding element 220 can include a metallic material, such as aluminum, an aluminum alloy with copper, silicon, tin, magnesium, manganese or zinc (e.g., of the aluminum 1000, 4000, or 5000 series), iron, an iron-carbon alloy (e.g., steel), silver, nickel, copper, and a copper alloy, among others. The negative bonding element 220 can extend partially within the cavity 130 defined by the housing 110. The negative bonding element 220 can correspond to the negative terminal 215 of the battery cell 105. The negative bonding element 220 can electrically couple the anode layer 140 disposed in the cavity 130 of the housing 110 with the negative terminal 215 to carry conventional electrical current out of the anode layer 140.

The battery cell 105 can include at least one negative contact 225. The negative contact 225 can be disposed or arranged on one end of the anode layer 140 disposed within the cavity 130 of the housing 110. The negative contact 225 can be at least partially in physical contact with a portion (e.g., a top end as depicted or along a longitudinal side) of the anode layer 140. The negative contact 225 can electrical couple the negative bonding element 220 to the anode layer 140 disposed within the cavity 130 of the housing 110. The negative contact 225 can be attached, welded, bonded, or otherwise joined to the negative bonding element 220. The negative contact 225 can carry conventional electrical current out of the anode layer 140 during operation of the battery cell 105. The electrically conductive material of the negative contact 225 can include a metallic material, such as aluminum, an aluminum alloy with copper, silicon, tin, magnesium, manganese or zinc (e.g., of the aluminum 1000, 4000, or 5000 series), iron, an iron-carbon alloy (e.g., steel), silver, nickel, copper, and a copper alloy, among others.

The battery cell 105 can have a set of cathode layers 135, a set of anode layers 140, and a set of solid electrolyte layers 145 arranged within the cavity 130 of the housing 110. The set of cathode layers 135, the set of anode layers 140, and the solid electrolyte layers 145 can be arranged in succession, stacked, or interleaved. At least one of the solid electrolyte layers 145 can separate one of the cathode layers 135 and one of the anode layers 140. At least one of the cathode layers 135 and at least one of the anode layers 140 can be separated without a solid electrolyte 145 between the cathode layer 135 and the anode layer 140. At least one of the cathode layers 135 and at least one of the anode layers 140 can be adjacent with each other. The set of cathode layers 135 and the set of anode layers 140 can be electrically coupled with one another in succession. Each cathode layer 135 can be electrically coupled with one of the anode layers 140. Each anode layer 140 can be electrically coupled with one of the cathode layers 135. Each cathode layer 135, each anode layer 140, each solid electrolyte layer 145 can be arranged longitudinally within the cavity 130. Each cathode layer 135, each anode layer 140, and each solid electrolyte layer 145 can at least partially extend from the bottom surface 120 to the top surface 115. Each cathode layer 135, each anode layer 140, each solid electrolyte layer 145 can be arranged laterally within the cavity 130. Each cathode layer 135, each anode layer 140, and each solid electrolyte layer 145 can at least partially extend from one side wall 125 to another side wall 125.

The solid electrolyte layer 145 can include at least one first side 230. The first side 230 can correspond to one surface of the solid electrolyte layer 145. The first side 230 can correspond to the surface facing the cathode layer 135. The cathode layer 135 can be disposed within the cavity 130 at least partially along the first side 230 of the solid electrolyte layer 145. At least one side of the cathode layer 135 can be in contact or flush with at least a portion of the first side 230 of the solid electrolyte layer 145. The cathode layer 135 can be electrically coupled with the solid electrolyte layer 145 through the first side 230. During operation of the battery cell 105 (e.g., charging or discharging), the cathode layer 135 can release lithium material into the solid electrolyte layer 145 through the first side 230. The lithium material released by the cathode layer 135 can move as cations through the solid electrolyte layer 145 and toward the anode layer 140 on the other side of the solid electrolyte layer 145.

The solid electrolyte layer 145 can include at least one second side 235. The second side 235 can correspond to another surface of the solid electrolyte layer 40. The second side 235 can correspond to the surface facing the anode layer 140. The anode layer 140 can be disposed within the cavity 130 at least partially along the second side 235 of the solid electrolyte layer 145. At least one side of the anode layer 140 can be in contact or flush with at least a portion of the second side 235 of the solid electrolyte layer 145. The anode layer 140 can be electrically coupled with the solid electrolyte layer 145 through the second side 235. During operation of the battery cell 105, the anode layer 140 can receive the lithium material conveyed through the solid electrolyte layer 145 via the second side 235. If the anode layer 140 were to comprise of graphite or lithium material, the lithium material can collect within the anode layer 140. As more and more lithium material is collected with repeated operation of the battery cell 105, the anode layer 140 can undergo the dendritic growth of the lithium material. The dendrite formation of the lithium material from the anode layer 140 can eventually pierce through the solid electrolyte layer 145 and reach the cathode layer 135, leading to short-circuiting of the battery cell 105.

Figure 3:
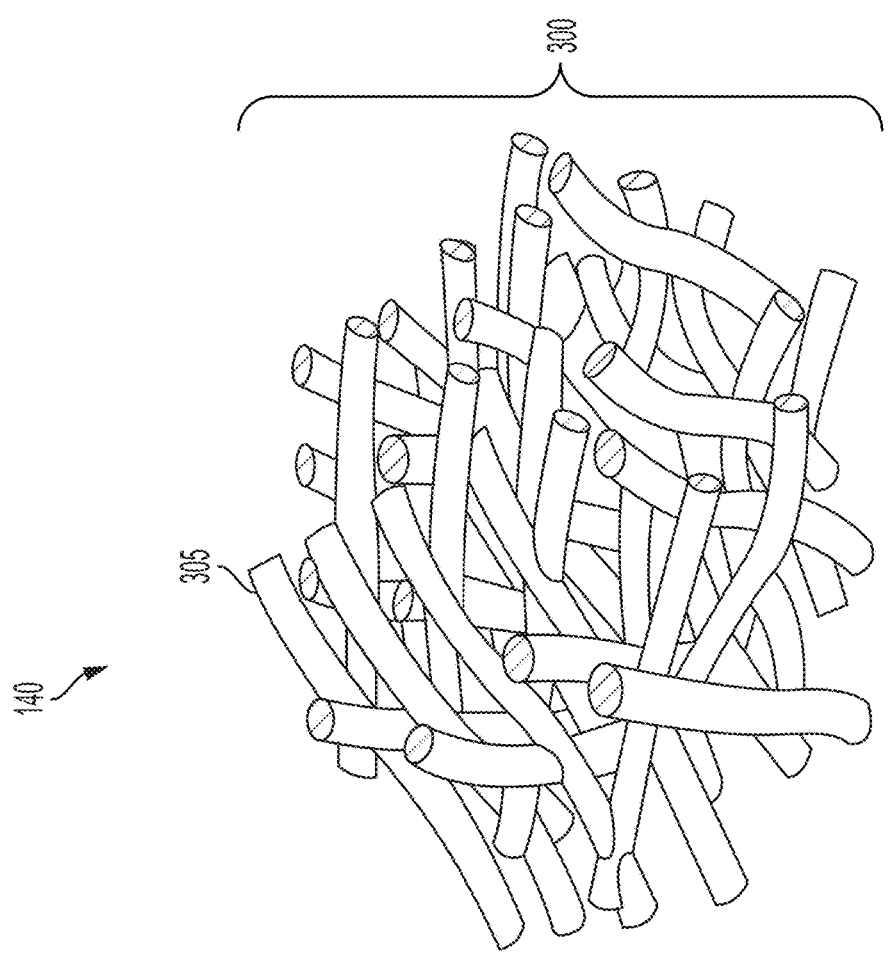
FIG. 3 is an isometric view of an example carbon nanotube structure in an anode of a battery cell for powering electric vehicles.

FIG. 3, among others, depicts an isometric view of a carbon nanotube structure 300 in the anode layer 140 of the battery cell 105 for powering electric vehicles. As depicted, the anode layer 140 can be comprised of or can include at least one carbon nanotube structure 300 (sometimes referred herein as a carbon nanotube scaffold). The carbon nanotube structure 300 can be porous. The carbon nanotube structure 300 can include a set of carbon nanotubes 305. Each carbon nanotube 305 can be a cylindrically shaped allotrope of carbon. Other allotropes of carbon can be used for the carbon nanotube structure 300, such as a fullerene. The dimensions of the carbon nanotube structure 300 can correspond to the dimensions of the anode layer 140. The carbon nanotube structure 300 can have a length ranging between 50 mm to 120 mm. The carbon nanotube structure 300 can have a width ranging between 50 mm to 20000 mm. The carbon nanostructure 300 can have a height ranging between 15 μm to 200 μm. Each carbon nanotube 305 can have a length (or height) ranging between 100 nm to 100 μm. Each carbon nanotube 305 can have a width ranging between 5 nm to 300 nm. Each carbon nanotube 305 can have a thickness ranging between 5 nm to 300 nm. Each carbon nanotube 305 can have a hollowing spanning lengthwise. The hollowing in each carbon nanotube 305 can have a length (or height) ranging between 100 nm to 100 μm. The hollowing in each carbon nanotube 305 can have a width ranging between 2 nm to 250 nm.

Within the carbon nanotube structure 300, the set of carbon nanotubes 305 can be arranged in an intercalated manner. The set of carbon nanotubes 305 can be stacked, piled, or heaped upon another. At least one carbon nanotube 305 can have a different orientation from another carbon nanotube 305 within the carbon nanotube structure 300. For example, as depicted, a subset of the carbon nanotubes 305 can span longitudinally and another subset of carbon nanotubes 305 can span laterally within the carbon nanotube structure 300. At least one carbon nanotube structure 305 can be straight within the carbon nanotube structure 300. At least one carbon nanotube structure 305 can be bent, twisted, curved, or arched within the carbon nanotube structure 300. The carbon nanotube structure 300 can have empty space or region defined between the carbon nanotubes 305.

The carbon nanotube structure 300 can be in contact with the solid electrolyte 145 At least some of the carbon nanotubes 305 can be adjacent to and in contact with the second side 235 of the solid electrolyte layer 145. In contact with the second side 235, the carbon nanotube structure 300 can receive the lithium material conveyed through the solid electrolyte layer 145 via the second side 235 during operation of the battery cell 105. The carbon structure 300 can be in contact with the negative contact 225. At least some of the carbon nanotubes 305 can be adjacent to and in contact with the negative contact 225 (e.g., on the top end or along a longitudinal side). The carbon nanotube structure 300 can be electrically coupled with the negative terminal 215 and the negative bonding element 220 through the negative contact. The carbon nanotube structure 300 can carry conventional electrical current out of the anode layer 140 during the operation of the battery cell 105.

Figure 4:
FIG. 4 is a cross-sectional perspective of an example carbon nanotube in an anode of a battery cell for powering electric vehicles.

FIG. 4, among others, depicts a cross-sectional perspective of one carbon nanotube 305 in the anode layer 140 of the battery cell 105 for powering electric vehicles. As depicted, each carbon nanotube 305 of the carbon nanotube structure 300 can have a body 400. The body 400 can correspond to a trunk portion of the carbon nanotube 305. The body 400 can have an outer surface 405. The outer surface 405 can correspond to a portion of the body 400 along the exterior of the carbon nanotube 305. The outer surface 405 of at least some of the carbon nanotubes 305 can be adjacent to and in contact with the second side 235 of the solid electrolyte layer 145. The outer surface 405 can receive the lithium material conveyed through the solid electrolyte layer 145 via the second side 235 during operation of the battery cell 105.

Each carbon nanotube 305 of the carbon nanotube structure 300 can have a set of pores 410. The set of pores 410 can render or make the carbon nanotube 305 lithio-philic receptive of lithium material received via the solid electrolyte layer 145. Each pore 410 can be defined partially through the body 400 of the carbon nanotube 305. Each pore 410 can have any shape. The shape of each pore 410 can be conical with a circular (e.g., as depicted), elliptical, or ovular base, among others. The shape of each pore 410 can also be pyramidal with a polygonal base, such as a triangle, a square, a rectangle, a pentagon, and a hexagon, among others. Each pore 410 can partially extend from the outer surface 400 into the body 400 of the carbon nanotube 305. Each pore 410 can have a depth ranging between 5 nm to 500 nm into the body 400 from the outer surface 405 of the carbon nanotube 305. Each pore 410 can have a width (or diameter) ranging between 2 nm to 200 nm. The width of each pore 410 can vary through the body 400. The width of the pore 410 on the outer surface 405 can be larger than the width of the pore 410 within the body 400. Each pore 410 can partially extend into the body 400 at an angle relative to outer surface 405 of the carbon nanotube 305. The angle of the pore 410 extending into the body 400 can range between 0° to 90° relative to the outer surface 405.

Figure 5:
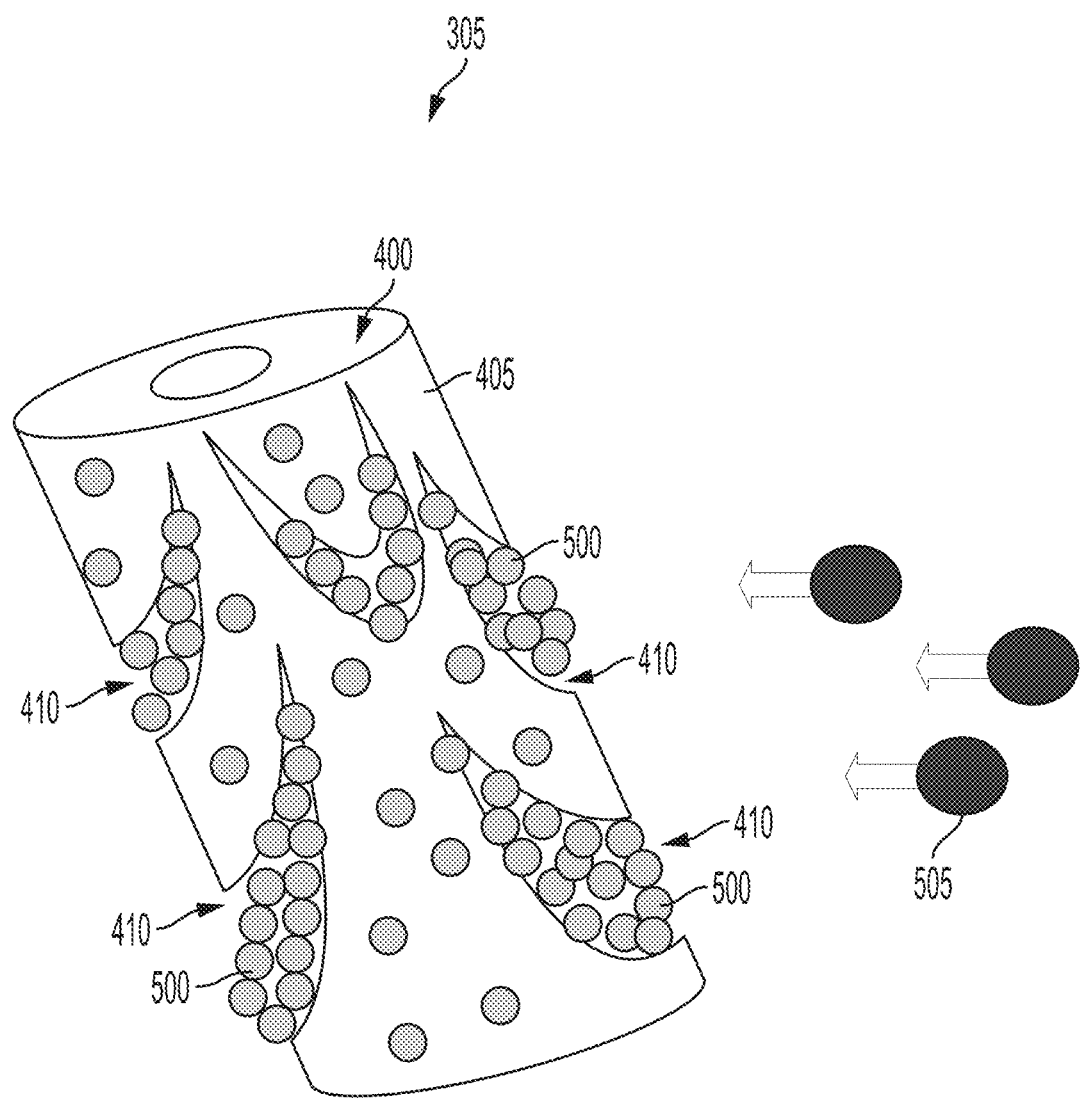
FIG. 5 is an isometric view of an example carbon nanotube in an anode of a battery cell for powering electric vehicles.

FIG. 5, among others, depicts an isometric view of one carbon nanotube 305 in the anode layer 140 of the battery cell 105 for powering electric vehicles. Each carbon nanotube 305 of the carbon nanotube structure 300 in the anode layer 140 can be infused, treated, doped, or otherwise deposited with electrolyte material 500. The electrolyte material 500 can be deposited along the outer surface 405 of the carbon nanotube 305. The electrolyte material 500 can be deposited within each pore 410 of the carbon nanotube 305. The electrolyte material 500 can have a preset distribution along the outer surface 405 and the set of pores 410 of the carbon nanotube 305. The preset distribution can be dependent on the porosity of the carbon nanotube 305. After doping the electrolyte material 500 onto the carbon nanotube 305, the carbon nanotube 305 can have a porosity ranging between 0 to 50%. The distribution of the electrolyte material 500 can be substantially even (e.g., within 15% deviation) along a surface area of the outer surface 405 and the set of pores 410 of the carbon nanotube 305. The distribution of the electrolyte material 500 can be in accordance to a normal distribution along the surface area of the outer surface 405 and the set of pores 410 of the carbon nanotube 305. The distribution of electrolyte material 500 can be in accordance to a random distribution along the surface area of the outer surface 405 and the set of pores 410 of the carbon nanotube 305.

The electrolyte material 500 deposited on the carbon nanotube 305 can be a solid electrolyte material. The electrolyte material 500 can be at least partially comprised of the same material as the solid electrolyte material 145. The electrolyte material 500 can be comprised of a ceramic electrolyte material, such as Lithium Phosphorous Oxy-Nitride ($Li_xPO_yN_z$), Lithium Sulfide-Copper Sulfide ($Li_2S$—CuS), Lithium Germanium Phosphate Sulfur ($Li_{10}GeP_2S_{12}$), Yttria-stabilized Zirconia (YSZ), NASICON ($Na_3Zr_2Si_2PO_{12}$), beta-alumina solid electrolyte (BASE), perovskite ceramics (e.g., Strontium titanate ($SrTiO_3$)), among others. The electrolyte material 500 can be comprised of a polymer electrolyte material, such as polyacrylonitrile (PAN), polyethylene oxide (PEO), polymethylmethacrylate (PMMA), and polyvinylidene fluoride (PVDF), among others. The electrolyte material 500 can be comprised of a glassy electrolyte material, such as Lithium Sulfide-Phosphor Pentasulfide ($Li_2S$—$P_2S_5$), Lithium Sulfide-Boron Sulfide ($Li_2S$—$B_2S_3$), and Tin Sulfide-Phosphor Pentasulfide ($SnS$—$P_2S_5$). The electrolyte material 500 can include any combination of the ceramic electrolyte material, the polymer electrolyte material, and the glassy electrolyte material, among others. The electrolyte material 500 can be at least partially comprised of a material to bond or connect with the material in the solid electrolyte layer 145. For example, the solid electrolyte layer 145 may be comprised of a glassy electrolyte material such as Lithium Sulfide- Phosphor Pentasulfide ($Li_2S$—$P_2S_5$). In this example, the electrolyte material 500 can be comprised of a ceramic electrolyte material such as Lithium Sulfide-Copper Sulfide ($Li_2S$—$CuS$) to bond with the glassy electrolyte material along the second side 235 of the solid electrolyte layer 145.

As electrolyte material 500 is deposited along the outer surface 400 and in the set of pores 405 of the carbon nanotube 305, the anode layer 140 can interface, bond, or otherwise connect with the material in the solid electrolyte layer 145 along the second surface 235. Through the interfacing with the solid electrolyte layer 145, the electrolyte material 500 deposited on the carbon nanotube 305 of the anode layer 140 can form an electrically conductive pathway between the negative contact 225 and the solid electrolyte layer 145. The electrolyte material 500 deposited on the carbon nanotube 305 can be electrically coupled with the solid electrolyte material 145 via the second surface 235. The electrolyte material 500 deposited on the carbon nanotube 305 can be electrically coupled with the negative contact 225 connected with the anode layer 140.

Figure 6:
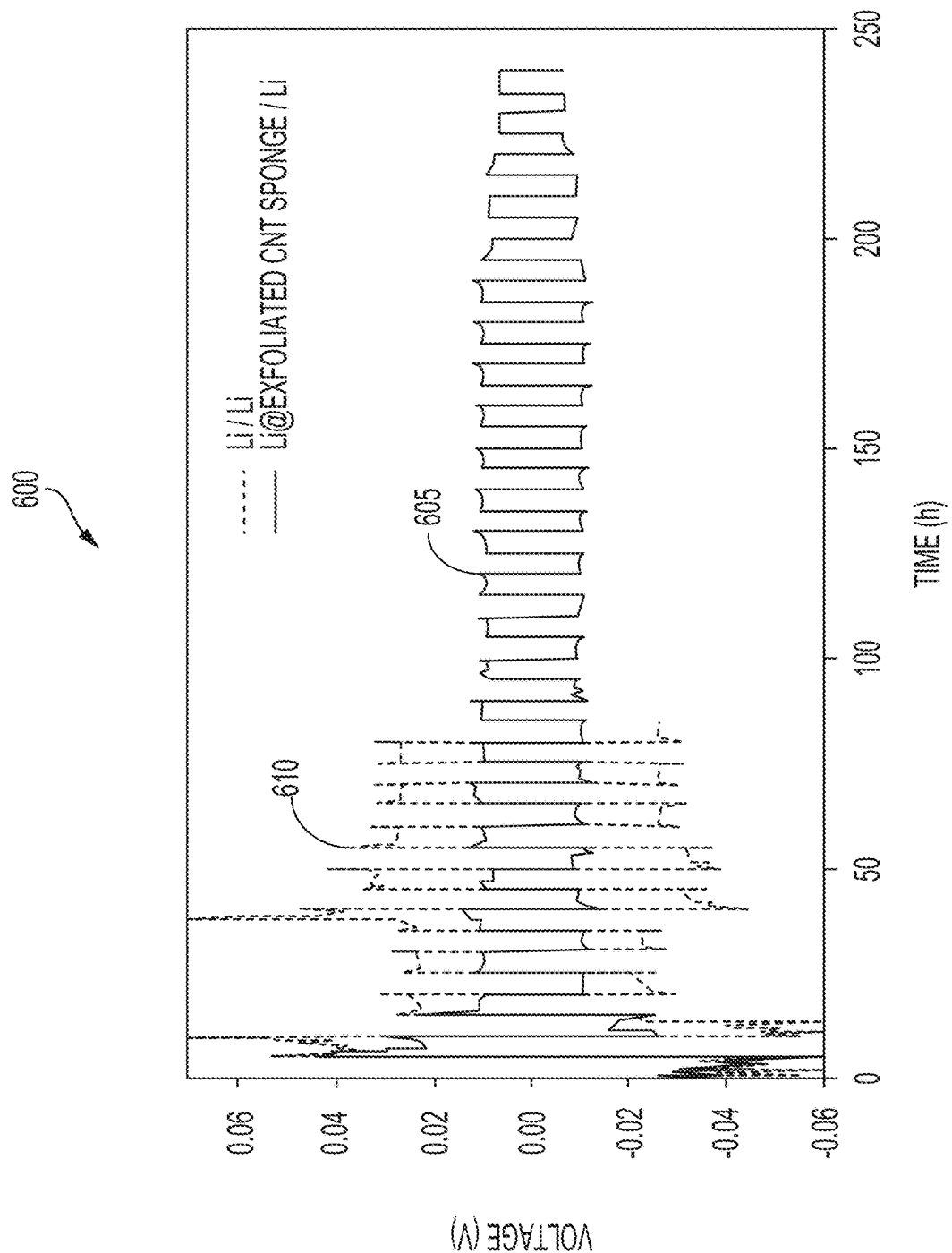
FIG. 6 is a graph depicting over potential during charging and discharging of battery cells for powering electric vehicles.

In this manner, the anode layer 140 deposited with the electrolyte material 500 can have a higher electric conductivity than anode layers without the deposition of the electrolyte material 500. Furthermore, since the electrolyte material 500 can interface with the solid electrolyte layer 145, the electrical resistance between the anode layer 140 and the solid electrolyte layer 145 can be reduced, relative to anode layers without the deposition of the electrolyte material 500. FIG. 6 depicts a graph 600 illustrating an over potential across time of the battery cell 105 with the carbon nanotube structure 300 and electrolyte material 500 versus an over potential of a battery cell with a lithium anode. The over potential can refer to a potential difference between a thermodynamically predicted voltage and an actual voltage under operating condition. The over potential can be related to a voltage efficiency of a battery cell. As depicted, the over potential 605 of the battery cell 105 with the carbon nanotube structure 300 and the electrolyte material 500 can be lower than the over potential 610 of than battery cells with the lithium anode. The battery cell 105 thus can have a higher voltage efficiency than battery cells with a lithium anode, without the carbon nanotube structure 300 together with the deposited electrolyte material 500.

Prior to the first use (e.g., initial charging cycle) of the battery cell 105, the anode layer 140 of the battery cell 105 may not be pre-doped with lithium material 505. The anode layer 140 can be initially free of lithium material 505 prior to the first charging cycle of the battery cell 105. The carbon nanotube structure 305 of the anode layer 140 can be free of any lithium material 505 prior to the first charging cycle of the battery cell 105. The carbon nanotube structure 305 of the anode 140 can be substantially free (e.g., less than 5%) of any lithium material 505 before the first charging cycle of the battery cell 105. Instead, the lithium material 505 can initially reside within the cathode layer 135 of the battery cell 105 prior to the first charging cycle of the battery cell 105. The lithium material 505 can also initially reside within the solid electrolyte layer 145 of the battery cell 105 before the first charging cycle of the battery cell 105.

During operation of the battery cell 105 (e.g., charging or discharging), the lithium material 505 can be transferred through the first surface 230 of the solid electrolyte layer 145 from the cathode layer 135. The lithium material 505 originally within the solid electrolyte layer 145 can also move toward the second surface 235 toward the anode layer 140 during the operation of the battery cell 105. The lithium material 505 can reach the carbon nanotube structure 300 of the anode layer 140 interfacing with the solid electrolyte layer 145 along the second surface 235. The carbon nanotube structure 300 of the anode layer 140 can receive the lithium material 505 transferred through the solid electrolyte layer 145 via the second surface 235. The set of pores 410 in each carbon nanotube 305 of the carbon nanotube structure 300 can gather, collect, or otherwise receive the lithium material 505 transferred through the solid electrolyte layer 145 via the second surface 235. Once received, the carbon nanotube structure 300 of the anode layer 140 can maintain or retain the lithium material 505 within the set of pores 405. Each pore 410 in each carbon nanotube 305 can hold or retain the lithium material 505 within the pore 410 received via the solid electrolyte layer 145. By retaining the lithium material 505 within each pore 410, each carbon nanotube 305 of the carbon nanotube structure 300 can prevent or reduce dendritic growth of the lithium material 505. The set of pores 410 in the carbon nanotube 305 can thus lower the risk of short circuiting, and thereby can improve the utility and lifespan of the battery cell 105 itself.

Figure 7:
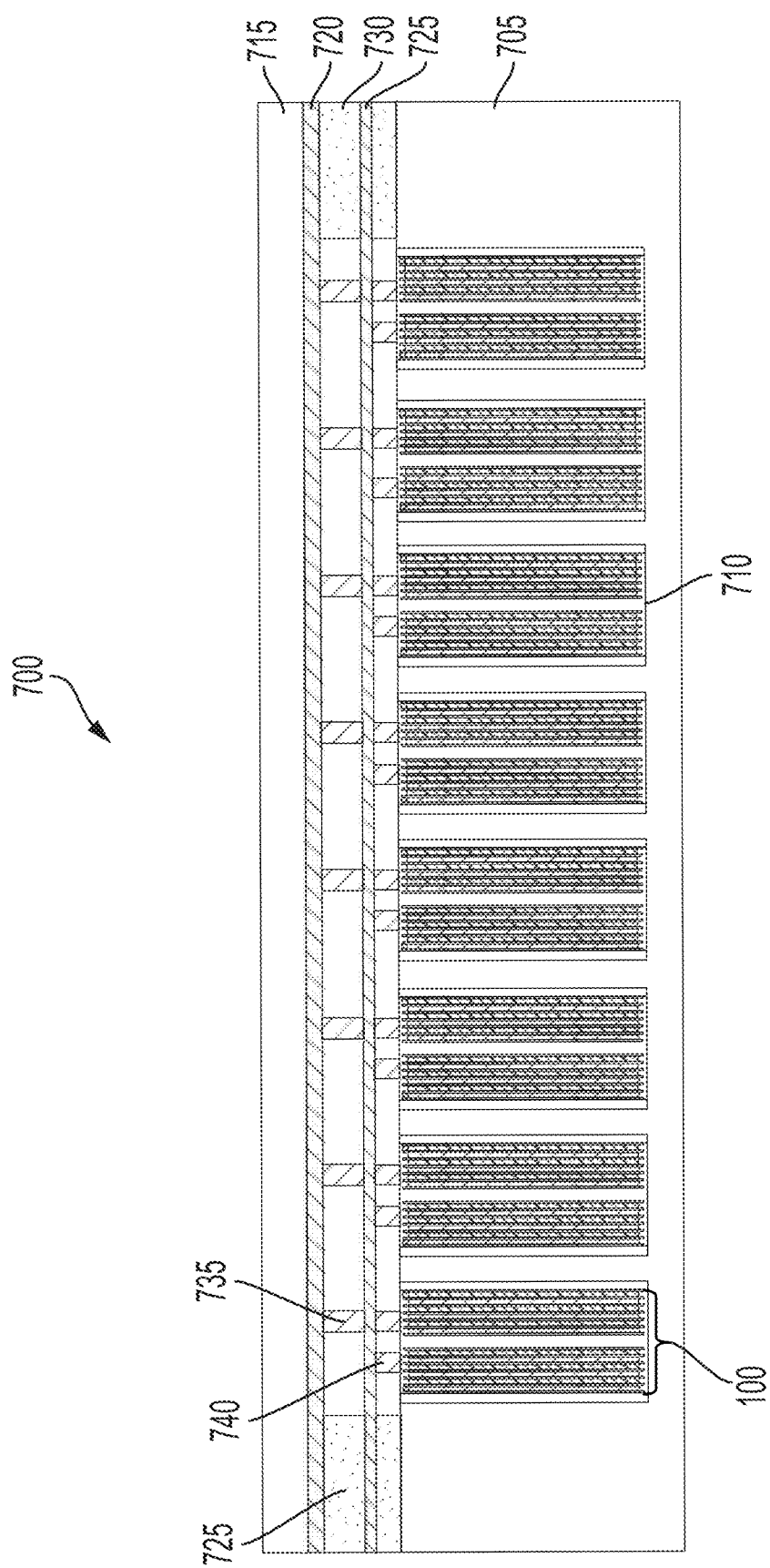
FIG. 7 is a block diagram depicting a cross-sectional view of an example battery module for holding battery cells in an electric vehicle.

FIG. 7 depicts is a cross-section view of a battery module 700 to hold a plurality of battery cells 100 in an electric vehicle. The battery module 700 can be part of the system or apparatus 100. The battery module 700 can be of any shape. The shape of the battery module 700 can be cylindrical with a circular, elliptical, or ovular base, among others. The shape of the battery module 700 can also be prismatic with a polygonal base, such as a triangle, a square, a rectangle (e.g., as depicted), a pentagon, and a hexagon, among others. The battery module 700 can have a length ranging between 10 cm to 200 cm. The battery module 700 can have a width ranging between 10 cm to 200 cm. The battery module 700 can have a height ranging between 65 mm to 100 cm.

The battery module 700 can include at least one battery case 705 and a capping element 715. The battery case 705 can be separated from the capping element 715. The battery case 705 can include or define a set of holders 710. Each holder 710 can be or include a hollowing or a hollow portion defined by the battery case 705. Each holder 710 can house, contain, store, or hold a battery cell 100. The battery case 705 can include at least one electrically or thermally conductive material, or combinations thereof. The positive terminal 200 and the negative terminal 215 of the battery cell 100 can extend from the battery cell 100 through the respective holder 710 of the battery case 705. The positive bonding element 205 and the negative bonding element 215 of the battery cell 100 can extend from the battery cell 100 through the respective holder 710 of the battery case 705.

Between the battery case 705 and the capping element 715, the battery module 700 can include at least one positive current collector 720, at least one negative current collector 725, and at least one electrically insulative layer 730. The positive current collector 720 and the negative current collector 725 can each include an electrically conductive material to provide electrical power to other electrical components in the electric vehicle. The positive current collector 720 (sometimes referred herein as a positive busbar) can be connected or otherwise electrically coupled with the positive terminal 200 of each battery cell 100 housed in the set of holders 710 via a bonding element 735. One end of the bonding element 735 can be bonded, welded, connected, attached, or otherwise electrically coupled to the positive terminal 200 of the battery cell 100. The negative current collector 725 (sometimes referred herein as a negative busbar) can be connected or otherwise electrically coupled with the negative terminal 215 of each battery cell 100 housed in the set of holders 710 via a bonding element 740.

The bonding element 740 can be bonded, welded, connected, attached, or otherwise electrically coupled to the negative terminal 215 of the battery cell 100.

The positive current collector 720 and the negative current collector 725 can be separated from each other by the electrically insulative layer 730. The electrically insulative layer 730 can include spacing to pass or fit the positive bonding element 735 connected to the positive current collector 720 and the negative bonding element 725 connected to the negative current collector 725. The electrically insulative layer 730 can partially or fully span the volume defined by the battery case 705 and the capping element 715. A top plane of the electrically insulative layer 730 can be in contact or be flush with a bottom plane of the capping element 715. A bottom plane of the electrically insulative layer 730 can be in contact or be flush with a top plane of the battery case 705. The electrically insulative layer 730 can include any electrically insulative material or dielectric material, such as air, nitrogen, sulfur hexafluoride ($SF_6$), ceramic, glass, and plastic (e.g., polysiloxane), among others to separate the positive current collector 720 from the negative current collector 725.

Figure 8:
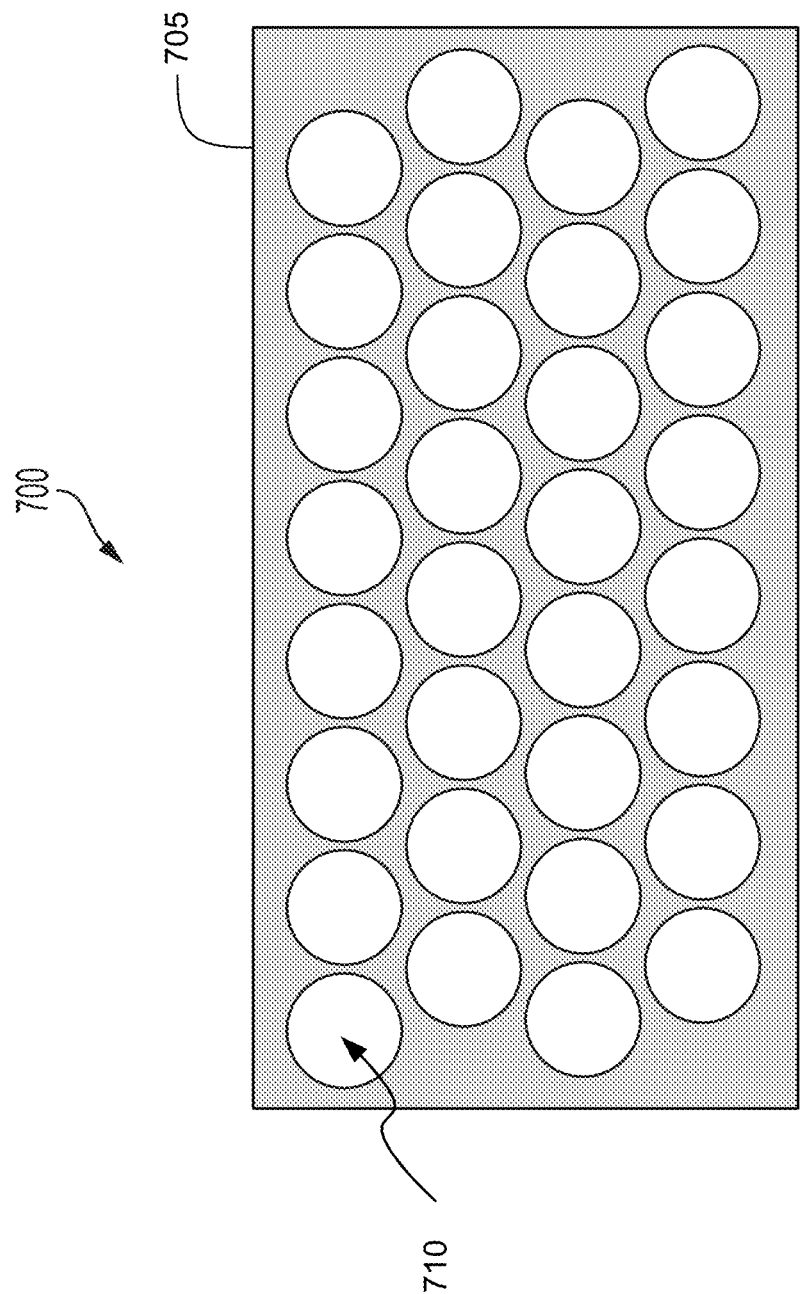
FIG. 8 is a block diagram depicting a top-down view of an example battery pack for holding for battery cells in an electric vehicle.

FIG. 8 depicts a top-down view of a battery module 700 to a hold a plurality of battery cells 100 in an electric vehicle. The battery module 700 can define or include a set of holders 710. The shape of each holder 710 can match a shape of the housing 105 of the battery cell 100. The shape of each holder 710 can be cylindrical with a circular (e.g., as depicted), elliptical, or ovular base, among others. The shape of each holder 710 can also be prismatic with a polygonal base, such as a triangle, a square, a rectangle, a pentagon, and a hexagon, among others. The shapes of each holder 710 can vary or can be uniform throughout the battery module 700. For example, some holders 710 can be hexagonal in shape, whereas other holders can be circular in shape. The dimensions of each holder 710 can be larger than the dimensions of the battery cell 100 housed therein. Each holder 710 can have a length ranging between 10 mm to 300 mm. Each holder 710 can have a width ranging between 10 mm to 300 mm. Each holder 710 can have a height (or depth) ranging between 65 mm to 100 cm.

Figure 9:
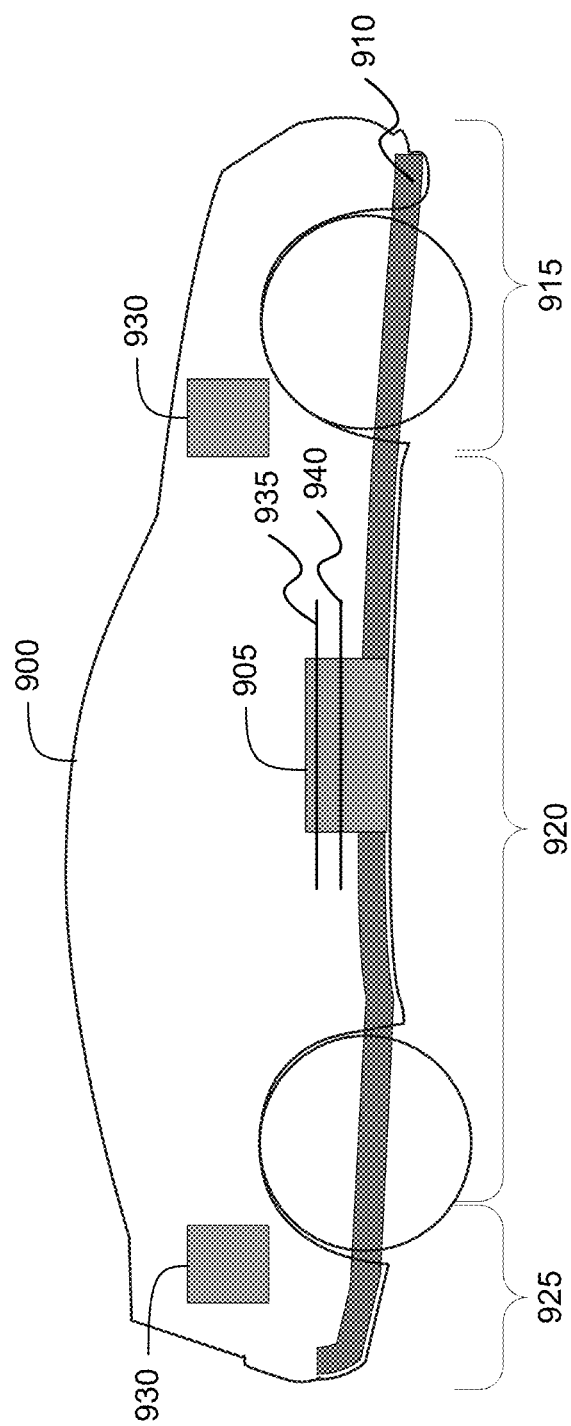
FIG. 9 is a block diagram depicting a cross-sectional view of an example electric vehicle installed with a battery pack.

Referring to FIG. 9, depicted is a cross-section view of an electric vehicle 900 installed with a battery pack 905. The electric vehicle 900 can be an electric automobile (e.g., as depicted), a motorcycle, a scooter, a passenger vehicle, a passenger or commercial truck, and another type of vehicle such as sea or air transport vehicles, a plane, a helicopter, a submarine, a boat, or a drone, among others. The electric vehicle 900 can include at least one battery pack 905. The battery pack 905 can be part of the system or apparatus 100. The battery pack 905 can house, contain, or otherwise include a set of battery modules 700. The number of battery modules 700 in the battery pack 905 can range between. The battery pack 905 can be of any shape. The shape of battery pack 905 can be cylindrical with a circular, elliptical, or ovular base, among others. The shape of battery pack 905 can also be prismatic with a polygonal base, such as a triangle, a square, a rectangle (e.g., as depicted), a pentagon, and a hexagon, among others. The battery pack 905 can have a length ranging between 100 cm to 600 cm. The battery pack 905 can have a width ranging between 50 cm to 400 cm. The battery pack 905 can have a height ranging between 70 mm to 1000 mm.

The electric vehicle 900 can include at least one chassis 910 (e.g., a frame, internal frame, or support structure). The chassis 910 can support various components of the electric vehicle 900. The chassis 910 can span a front portion 915 (e.g., a hood or bonnet portion), a body portion 920, and a rear portion 925 (e.g., a trunk portion) of the electric vehicle 900. The battery pack 905 can be installed or placed within the electric vehicle 900. The battery pack 905 can be installed on the chassis 910 of the electric vehicle 900 within the front portion 915, the body portion 920 (as depicted in FIG. 9), or the rear portion 925.

The electric vehicle 900 can include one or more components 930. The one or more components 930 can include an electric engine, an entertainment system (e.g., a radio, display screen, and sound system), on-board diagnostics system, and electric control units (ECUs) (e.g., an engine control module, a transmission control module, a brake control module, and a body control module), among others. The one or more components 930 can be installed in the front portion 915, the body portion 920, or the rear portion 925 of the electric vehicle 100. The battery pack 905 installed in the electric vehicle 900 can provide electrical power to the one or more components 930 via at least one positive current collector 935 and at least one negative current collector 940. The positive current collector 935 and the negative current collector 940 can be connected or otherwise be electrically coupled to other electrical components of the electric vehicle 900 to provide electrical power. The positive current collector 935 (sometimes herein referred to as a positive busbar) can be connected or otherwise electrically coupled with each positive current collector 720 of each battery module 700 in the battery pack 905. The negative current collector 940 (sometimes herein referred to as a negative busbar) can be connected or otherwise electrically coupled with each negative current collector 725 of each battery module 700 in the battery pack 905.

Figure 10:
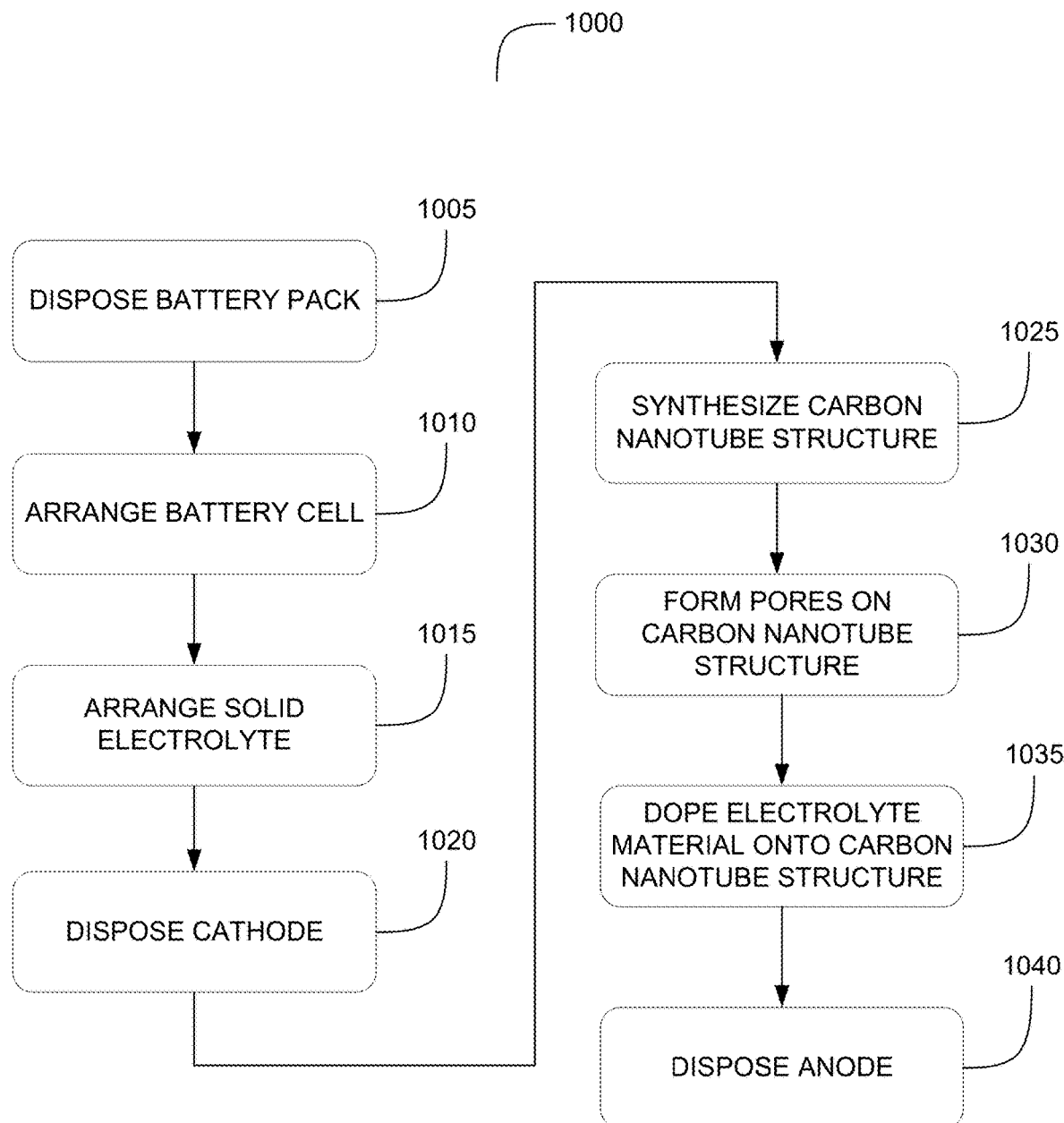
FIG. 10 is a flow diagram depicting an example method of assembling battery cells for battery packs for electric vehicles.

Referring to FIG. 10, depicted is a method 1000 of assembling battery cells for battery packs in electric vehicles. The functionalities of the method 1000 can be implemented or performed using any of the systems, apparatuses, or battery cells detailed above in conjunction with FIGS. 1-9. The method 1000 can include disposing a battery pack 905 (ACT 1000). The battery pack 905 can be installed, arranged, or otherwise disposed in an electric vehicle 900. The battery pack 905 can house, contain, or include a set of battery modules 700. The battery pack 905 can store electrical power for one or more components 930 of the electric vehicle 900. The battery pack 905 can provide electrical power to the one or more components 930 via a positive current collector 935 and a negative current collector 940.

The method 1000 can include arranging a battery cell 105 (ACT 1005). The battery cell 105 can be a lithium-ion solid state battery cell. The battery cell 105 can be stored or contained within a holder 720 of the battery module 700 included in the battery pack 905. The battery cell 105 can include a housing 110. The housing 110 can be formed from a cylindrical casing with a circular, ovular, or elliptical base or from a prismatic casing with a polygonal base. The housing 110 can include a top surface 115, a bottom surface 120, and a sidewall 125. The housing 110 can have a cavity 130 to contain contents of the battery cell 105. The cavity 130 within the housing 110 can be defined by the top surface 115, the bottom surface 120, and the sidewall 125.

The method 1000 can include arranging a solid electrolyte layer 145 (ACT 1010). The solid electrolyte layer 145 can be formed using deposition techniques, such as chemical deposition (e.g., chemical vapor deposition (CVD) or atomic layer deposition (ALD)) or physical deposition (e.g., molecular beam epitaxy (MBE) or physical vapor deposition (PVD)). The solid electrolyte layer 145 can be comprised of ceramic electrolyte materials, glassy electrolyte materials, or polymer electrolyte materials, or any combination thereof. The solid electrolyte layer 145 can be fed, inserted, or otherwise placed into the cavity 130 of the housing 110 for the battery cell 105. The solid electrolyte layer 145 can at least partially span between the top surface 115, the bottom surface 120, and the sidewall 125 of the housing 110 for the battery cell 105.

The method 1000 can include disposing a cathode layer 135 (ACT 1020). The cathode layer 135 can be formed using deposition techniques, such as chemical deposition (e.g., chemical vapor deposition (CVD) or atomic layer deposition (ALD)) or physical deposition (e.g., molecular beam epitaxy (MBE) or physical vapor deposition (PVD)). The cathode layer 135 can be comprised of solid cathode materials, such as lithium-based oxide materials or phosphates. The cathode layer 135 can be placed or inserted into the cavity 130 of the housing 110 for the battery cell 105. The cathode layer 135 can be situated at least partially along the first side 230 of the solid electrolyte layer 145. The cathode layer 135 can output conventional electrical current into the battery cell 100. The cathode layer 135 can be electrically coupled with the positive terminal 200 of the battery cell 105.

The method 1000 can include synthesizing a carbon nanotube structure 300 (ACT 1025). The carbon nanotube structure 300 can be porous, and can have a set of carbon nanotubes 305. The carbon nanotube structure 300 can be formed using deposition techniques, such as chemical deposition (e.g., chemical vapor deposition (CVD) or atomic layer deposition (ALD)) or physical deposition (e.g., molecular beam epitaxy (MBE) or physical vapor deposition (PVD)). For example, CVD technique with a three-zone furnace can be used to create the carbon nanotube structure 300. A crucible with an organometallic compound (e.g., Ferrocene ($Fe(C_5H_5)_2$)) can be placed in a first zone within a container (e.g., a quartz tube) under atmospheric pressure (e.g., within 10% of 1013.25 mbar). During the growth of the carbon nanotube structure 300 from the organometallic compound, hydrogen has can be fed into the container at 260 sccm, ethylene gas can be fed into the container at 80 sccm, and wet argon gas can be fed into the container at 80 sccm. The temperature of the furnace can be set to 120° C. in the first zone, 120° C. in the second zone, and 650° C. for the third zone. The process of growing the carbon nanotube structure 300 can take up to 15 minutes. The carbon nanotube structure 300 can include the carbon nanotubes 305 in an intercalated matter.

The method 1000 can include forming pores 410 on the carbon nanotube structure 300 (ACT 1030). Once synthesized, the outer surface 405 of each carbon nanotube 305 of the carbon nanotube structure 300 can be treated to form the set of pores 410 into the body 400 of the carbon nanotube 305. The carbon nanotube structure 300 itself can be cut or separated into different shapes depending on a form or shape of the cavity 130 of the housing 110 for the battery cell 105. To form the pores 410, an acidic solution can be applied to the outer surface 405 of the carbon nanotubes 305 of the carbon nanotube structure 300. For example, the carbon nanotube structure 300 can be passed through or placed into an acidic solution of potassium permanganate ($KMnO_4$) (>99%) and sulfuric acid (95-98%), with 0.5 g of potassium permanganate per liter of sulfuric acid. The carbon nanotube structure 300 can under the treatment in a vacuum filtration environment. The acidic agent can be applied onto the carbon nanotube structure 300 while a vacuum can be operated from underneath the carbon nanotube structure 300. As the acidic agent is applied, the pores 410 can form on the body 400 of each carbon nanotube 305 in the carbon nanotube structure 300. The formation of pores 410 can render the carbon nanotube structure 300 porous and lithiophilic receptive to lithium material 505.

The method 1000 can include doping electrolyte material 500 onto the carbon nanotube structure 300 (ACT 1035). With the formation of the pores 410, the carbon nanotube structure 300 can be infused, treated, or deposited with the electrolyte material 500. The electrolyte material 500 can be comprised of ceramic electrolyte materials, glassy electrolyte materials, or polymer electrolyte materials, or any combination thereof. The electrolyte material 500 can be dispersed in a solvent solution. The carbon nanotube structure 300 can be doused or immersed in the solve solution to dope the carbon nanotube structure 300 with the electrolyte material 500. The electrolyte material 500 can be distributed substantially evenly (e.g., within 15% deviation) or randomly about the outer surface 405 and the set of pores 410 of each carbon nanotube 305 of the carbon nanotube structure 300. The solvent solution can be removed from the carbon nanotube structure 300 by drying.

The method 1000 can include disposing an anode layer 140 (ACT 1040). The carbon nanotube structure 300 can be part of an anode layer 140 of the battery cell 105. The anode layer 140 can be placed or inserted into the cavity 130 of the housing 110 for the battery cell 105. The anode layer 140 can be situated at least partially along the second side 235 of the solid electrolyte layer 145. The anode layer 140 can receive conventional electrical current into the battery cell 100. The anode layer 140 can be electrically coupled with the negative terminal 215 of the battery cell 105. The carbon nanotube structure 300 of the anode layer 140 can bond or interface with the solid electrolyte layer 145 to form an electrically conductive path through the anode layer 140. The anode layer 140 can be initially free of any lithium material 505, prior to the first charging cycle of the battery cell 105. During the charging cycle of the battery cell 105, the carbon nanotube structure 300 can receive the lithium material 505 transferred through the solid electrolyte layer 145 via the second side 235. Each carbon nanotube 305 of the carbon nanotube structure 305 can retain the lithium material 505 within the pores 410.

Figure 11:
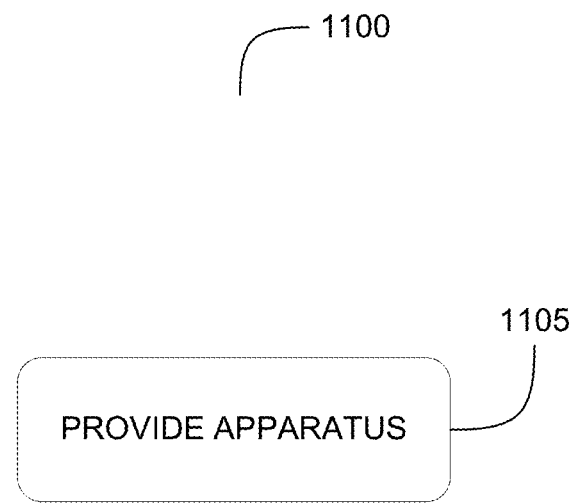
FIG. 11 is a flow diagram depicting an example of method of providing battery cells for battery packs for electric vehicles.

Referring to FIG. 11, depicted is a method 1100 of providing battery cells for battery packs in electric vehicles. The functionalities of the method 1100 can be implemented or performed using any of the systems, apparatuses, or battery cells detailed above in conjunction with FIGS. 1-9. The method 1100 can include providing an apparatus 100. The apparatus 100 can be installed in an electric vehicle 900. The apparatus 100 can include a battery pack 905 disposed in the electric vehicle 900 to power one or more components 930 of the electric vehicle 900. The battery pack 905 can include one or more battery modules 700. The apparatus 100 can include a set of battery cells 105. Each battery cell 105 can be arranged in the battery module 700. The battery cell 105 can include a housing 110. The housing 110 can include a top surface 115, a bottom surface 120, and a sidewall 125. The top surface 115, the bottom surface 120, and the sidewall 125 can define a cavity 130.

Within the cavity 130 defined by the housing 110, the battery cell 105 can have a solid electrolyte layer 145. The solid electrolyte layer 145 can have a first side 230 and a second side 235, and can transfer ions between the first side 230 and the second side 235. The battery cell 105 can have a cathode layer 135 disposed within the cavity 130 of the housing 110. The cathode layer 135 can be situated along the first side 230 of the solid electrolyte layer 145. The cathode layer 135 can be electrically coupled with the positive terminal 200. The battery cell 105 can have an anode layer 140 disposed within the cavity 130 of the housing 110. The anode layer 140 can be situated along the second side 235 of the solid electrolyte layer 145, and can be separated from the cathode layer 135 by the solid electrolyte layer 145. The anode layer 140 can be electrically coupled with the negative terminal 215. The anode layer 140 can have a carbon nanotube structure 300. The carbon nanotube structure 300 can have a set of pores 410 to retain lithium material 505 received via the solid electrolyte layer 145. The carbon nanotube structure 300 can be deposited with electrolyte material 500.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

References to "or" can be construed as inclusive so that any terms described using "or" can indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

Systems and methods described herein may be embodied in other specific forms without departing from the characteristics thereof. For example, descriptions of positive and negative electrical characteristics may be reversed. For example, elements described as negative elements can instead be configured as positive elements and elements described as positive elements can instead by configured as negative elements. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. An apparatus to store electrical energy for electric vehicles, comprising:
    a battery pack disposed in an electric vehicle to power the electric vehicle; and
    a battery cell arranged in the battery pack, the battery cell having a housing that defines a cavity within the housing of the battery cell, the battery cell having:
        a solid electrolyte having a first side and a second side to transfer ions between the first side and the second side, the solid electrolyte arranged within the cavity;
        a cathode disposed within the cavity along the first side of the solid electrolyte, the cathode electrically coupled with a positive terminal;
        an anode having a carbon nanotube structure, the anode disposed within the cavity along the second side of the solid electrolyte and separated from the cathode by the solid electrolyte, the anode electrically coupled with a negative terminal;

the carbon nanotube structure lacking lithium material prior to an initial operation of the battery cell;

the carbon nanotube structure having an outer surface and a plurality of pores deposited throughout with a solid electrolyte material prior to the initial operation of the battery cell, the solid electrolyte material deposited throughout the carbon nanotube structure;

the carbon nanotube structure having an electrically conductive connection formed during at least one operation of the battery cell between the solid electrolyte and the negative terminal through the anode via the solid electrolyte material deposited on the outer surface and the plurality of pores;

the plurality of pores partially extending from the outer surface into a body of the carbon nanotube structure at an acute angle to reduce a dendritic formation of the lithium material from the negative terminal by retaining the lithium material received via the solid electrolyte within each pore of the plurality of pores during the at least one operation of the battery cell; and the solid electrolyte material deposited within the plurality of pores being at least one ceramic material selected from a group consisting of lithium phosphorous oxynitride, lithium germanium phosphorus sulfide, yttria-stabilized zirconia, sodium superionic conductor, and beta-alumina solid electrolyte.

2. The apparatus of claim 1, wherein:
the carbon nanotube structure of the anode is not pre-doped with the lithium material prior to an initial charging cycle of the battery cell.

3. The apparatus of claim 1, wherein:
the carbon nanotube structure is in contact with the second side of the solid electrolyte to receive the lithium material from the cathode via the solid electrolyte concurrent with the at least one operation of the battery cell.

4. The apparatus of claim 1, wherein:
the carbon nanotube structure of the anode has the outer surface,
the outer surface and the plurality of pores are both doped with the solid electrolyte material at a preset distribution to allow electrical conductivity through the anode, and
the solid electrolyte material lacks the lithium material.

5. The apparatus of claim 1, wherein:
the carbon nanotube structure of the anode has the body and the outer surface,
the carbon nanotube structure has the plurality of pores, and
each pore of the plurality of pores extends from the outer surface at an angle relative to the outer surface into the body to retain the lithium material within the pore.

6. The apparatus of claim 1, wherein:
the carbon nanotube structure of the anode has a plurality of intercalated carbon nanotubes, and
each intercalated carbon nanotube of the plurality of intercalated carbon nanotubes has the plurality of pores to receive the lithium material from the cathode via the solid electrolyte.

7. The apparatus of claim 1, wherein:
at least a portion of the outer surface of the carbon nanotube structure is in contact with the solid electrolyte to receive the lithium material via the solid electrolyte.

8. The apparatus of claim 1, wherein:
the cathode of the battery cell comprises the lithium material to be transferred to the carbon nanotube structure of the anode via the solid electrolyte concurrent to the at least one operation of the battery cell within the electric vehicle.

9. The apparatus of claim 1, wherein:
the battery pack is installed in the electric vehicle to power one or more components of the electric vehicle.

10. A method of providing battery cells to power electric vehicles, comprising:
disposing a battery pack in an electric vehicle to power the electric vehicle;
arranging a housing for a battery cell in the battery pack, the housing defining a cavity within the housing for the battery cell;
arranging, within the cavity of the battery cell, a solid electrolyte having a first side and a second side to transfer ions between the first side the second side;
disposing, within the cavity of the battery cell, a cathode along the first side of the solid electrolyte, the cathode electrically coupled with a positive terminal;
disposing, within the cavity, an anode having a carbon nanotube structure along the second side of the solid electrolyte, the anode separated from the cathode by the solid electrolyte, the anode electrically coupled with a negative terminal, the carbon nanotube structure lacking lithium material prior to an initial operation of the battery cell;
depositing the carbon nanotube structure having an outer surface and a plurality of pores with solid electrolyte material prior to the initial operation of the battery cell, the solid electrolyte material deposited throughout the carbon nanotube structure, the carbon nanotube structure having an electrically conductive connection formed during at least one operation of the battery cell between the solid electrolyte and the negative terminal through the anode via the solid electrolyte material deposited on the outer surface and the plurality of pores; and
defining the plurality of pores on the carbon nanotube structure, each pore of the plurality of pores partially extending from the outer surface into a body of the carbon nanotube structure at an acute angle to reduce a dendritic formation of the lithium material from the negative terminal by retaining the lithium material received via the solid electrolyte within the pore during the at least one operation of the battery cell,
wherein the solid electrolyte material deposited within the plurality of pores is at least one ceramic material selected from a group consisting of lithium phosphorous oxynitride, lithium germanium phosphorus sulfide, yttria-stabilized zirconia, sodium superionic conductor, and beta-alumina solid electrolyte.

11. The method of claim 10, comprising:
creating the carbon nanotube structure of the anode, the carbon nanotube structure having a plurality of intercalated carbon nanotubes, each intercalated carbon nanotube of the plurality of intercalated carbon nanotubes defining the plurality of pores to receive the lithium material from the cathode via the solid electrolyte.

12. The method of claim 10, comprising:
creating the carbon nanotube structure of the anode initially free of the lithium material, the carbon nanotube structure to receiving the lithium material from the cathode via the solid electrolyte concurrent to the at least one operation of the battery cell within the electric vehicle.

13. The method of claim 10, comprising:
applying an acidic solution to the outer surface of the carbon nanotube structure to define the plurality of pores into the body of the carbon nanotube structure, each pore of the plurality of pores extending from the outer surface at an angle relative to the outer surface into the body to retain the lithium material within the pore.

14. The method of claim 10, comprising:
doping the solid electrolyte material on the outer surface and the plurality of pores of the carbon nanotube structure at a preset distribution to allow electrical conductivity through the anode, the solid electrolyte material lacking the lithium material.

15. The method of claim 10, comprising:
installing the battery pack in the electric vehicle to power one or more components of the electric vehicle.

16. An electric vehicle, comprising:
one or more components;
a battery pack to power the one or more components;
a battery cell arranged in the battery pack, the battery cell having a housing that defines a cavity within the housing of the battery cell, the battery cell having:
a solid electrolyte having a first side and a second side to transfer ions between the first side and the second side, the solid electrolyte arranged within the cavity;
a cathode disposed within the cavity along the first side of the solid electrolyte, the cathode electrically coupled with a positive terminal;
an anode having a carbon nanotube structure, the anode disposed within the cavity along the second side of the solid electrolyte and separated from the cathode by the solid electrolyte, the anode electrically coupled with a negative terminal;
the carbon nanotube structure lacking lithium material prior to an initial operation of the battery cell;
the carbon nanotube structure having an outer surface and a plurality of pores deposited throughout with a solid electrolyte material prior to the initial operation of the battery cell, the solid electrolyte material deposited throughout the carbon nanotube structure;
the carbon nanotube structure having an electrically conductive connection formed during at least one operation of the battery cell between the solid electrolyte and the negative terminal through the anode via the solid electrolyte material deposited on the outer surface and the plurality of pores;
the plurality of pores partially extending from the outer surface into a body of the carbon nanotube structure at an acute angle to reduce a dendritic formation of the lithium material from the negative terminal by retaining the lithium material received via the solid electrolyte within each pore of the plurality of pores during the at least one operation of the battery cell; and
the solid electrolyte material deposited within the plurality of pores being at least one ceramic material selected from a group consisting of lithium phosphorous oxynitride, lithium germanium phosphorus sulfide, yttria-stabilized zirconia, sodium superionic conductor, and beta-alumina solid electrolyte.

17. The electric vehicle of claim 16, wherein:
the carbon nanotube structure of the anode has the body and the outer surface,
the carbon nanotube structure has the plurality of pores, and
each pore of the plurality of pores extends from the outer surface at an angle relative to the outer surface into the body to retain the lithium material within the pore.

\* \* \* \* \*